INVENTORS
*William M. Laird and
Malcolm R.J. Wyllie*
BY

ATTORNEY.

3,047,488
REFERENCE ELECTRODE

William M. Laird, Fox Chapel Borough, and Malcolm R. J. Wyllie, Indiana Township, Allegheny County, Pa., assignors to Gulf Research & Development Company, Pittsburgh, Pa., a corporation of Delaware
Original application Dec. 29, 1953, Ser. No. 401,030. Divided and this application Mar. 20, 1959, Ser. No. 800,704

3 Claims. (Cl. 204—195)

This invention relates to new and useful improvements in electrodes for producing an electrical potential that is a function of the activity of selected ions in a moving stream, and more particularly pertains to an electrode of such character especially well adapted for furnishing an indication of the activity of selected ions in a stream of composite character including suspended solids.

This application is a division of our application Serial No. 401,030, now United States Patent No. 2,930,967, filed December 29, 1953, and entitled "Method and Apparatus for Logging Drilling Fluid."

Broadly, the electrode construction of this invention involves a tubular casing adapted to constitute a segment or part of a conduit for fluids, means within and in contact with the casing for presenting a large surface area, and an electrode electrochemically reversible with respect to a selected ion defining at least a substantial portion of the exposed surfaces of such means and preferably also the exposed inner surface of the casing.

In a more specific aspect, an electrode construction according to the invention involves a tubular casing adapted to constitute a segment of a conduit for fluids, an elongated and generally streamlined body centrally disposed in the casing, a plurality of vanes connecting the body and the casing, and an electrode electrochemically reversible with respect to a selected ion defining a substantial portion of the exposed surfaces of the body and the vanes. In the preferred construction, the electrode defines the entirety of the exposed surfaces of the body, the vanes, and the interior of the casing.

Figure 1:
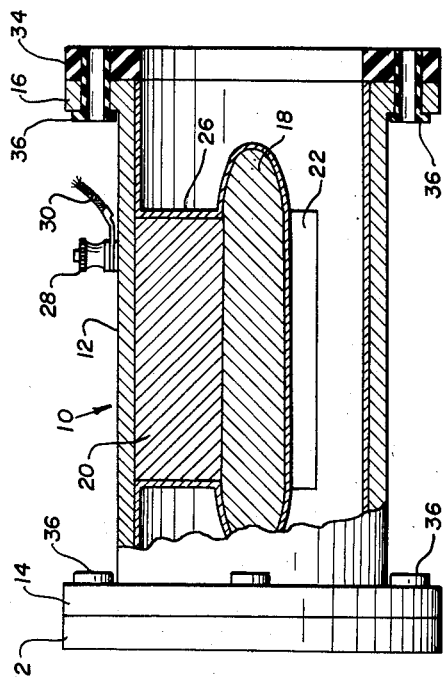
Figure 2:
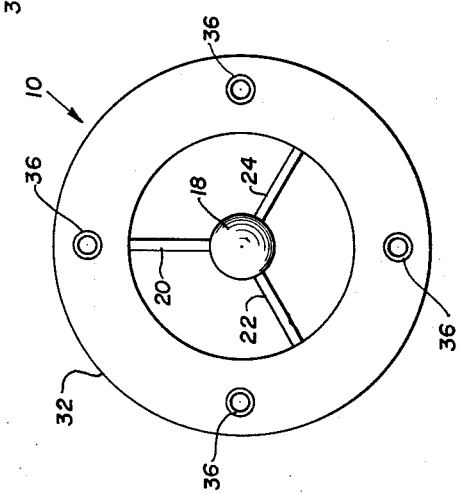

The invention will be best appreciated upon reference to the accompanying drawings of a preferred embodiment thereof, wherein FIGURE 1 is a side elevational view of the electrode construction with portions thereof being shown in central vertical section, and wherein FIGURE 2 is an end view of the electrode construction shown in FIGURE 1.

Referring to the drawings, the numeral 10 designates the electrode construction generally. The electrode construction 10 is comprised of a metallic tubular casing 12 provided with securing flanges 14 and 16 at its opposite ends.

An elongated, streamlined, cigar-shaped body 18 is concentrically disposed within the tubular casing 12. The body 18 is substantially smaller than the tubular casing 12 and is retained in position by a plurality of radially extending supporting vanes 20, 22, and 24, each of which is suitably secured to the body 18 and the casing 12. Considered together, the body 18 and the vanes 20, 22, and 24 constitute means within the casing 12 presenting a large surface area.

The entire exposed surface of the body 18, the vanes 20, 22, and 24 and the interior of the tubular casing 12 is coated with an active electrode material 26. The character of the active electrode material 26 and the surface thereof will be described in more detail subsequently. The body 18 and the vanes 20, 22, and 24 are preferably of metallic construction so as to afford good electrical conductance between all portions of the active electrode material 26 and the metallic tubular casing 12. An electrical binding post 28 is fixed to the exterior of the tubular casing 12 in electrical contact therewith, and an electrical conductor 30 is connected to the binding post 28 for conducting electrical potentials developed by the active electrode material 26 to suitable measuring instruments, or the like (not shown).

The active electrode material 26 can be of such character as to be electrochemically reversible with respect to a selected ion or class of ions. For example, if it is desired that the active electrode material 26 be selectively sensitive to the activities of chloride ions, the active electrode material 26 can conveniently be a silver-silver chloride combination. Electrode components comprised of a combination of silver and silver chloride are known to the prior art, and usually comprise metallic silver partially coated with silver chloride.

In the event it is desired that the active electrode material 26 be electrochemically reversible with respect to iodide or bromide ions, for example, the active electrode material 26 can be silver as described above, however, the exposed surface thereof is coated with the silver salt of the particular halide involved.

Alternatively, the active electrode material 26 can be electrochemically reversible with respect to sulfate ions, in which instance the active electrode material 26 is constituted of lead, the exterior surface of which is at least partially coated with lead sulfate.

The manner in which the active electrode material 26 is coated upon the body 18, the vanes 20, 22, and 24, and the internal surface of the tubular casing 12 will largely depend upon the character of the active electrode material 26 to be employed. The selection of the character of the active electrode material 26, as well as the mode by which the same is applied to the external surfaces of the body 18, the vanes 20, 22, and 24, and the casing 12 will lie well within the skill of those familiar with the art. Ordinarily, the selection of the active electrode material 26 will be such that the coating operation can conveniently be accomplished by electrodeposition, by dipping in molten material, flame spraying, etc.

The electrode construction 10 not only affords a large area of intimate contact with fluids, while affording little resistance to fluid flow, but also serves as a conduit for such fluids; the electrode construction 10 being provided with means for interposing the same in a fluid conduit without being in electrical contact therewith. Such means comprise electrically nonconductive gaskets 32 and 34 positioned against the flanges 14 and 16, respectively, with electrically nonconductive bushings 36 extending through aligned openings in each flange and its respective gasket. The arrangement is such that the electrode construction 10 can be interposed in a conduit and secured to flanges, not shown, on adjacent ends thereof by nuts and bolts, not shown.

Not only does the electrode construction 10 afford a large surface area for the active electrode material 26 while offering a minimum resistance to fluid flow, the active electrode material 26 is disposed in such a manner that the surface thereof is susceptible to the cleaning or scouring action of the stream of fluid passing therethrough, so that the deleterious effects of solids that may be contained in the fluid passing through the electrode construction 10 are entirely or at least largely obviated.

It is believed that no further description of the invention is necessary for full and complete understanding thereof by those skilled in the art. The actual scope of the invention should be ascertained upon reference to the appended claims.

We claim:
1. An electrode construction comprising an open-ended tubular casing, an elongated body centrally disposed in the casing in longitudinal alignment with the casing, a plurality of vanes in longitudinal alignment with the casing connecting the body to the casing and supporting the elon- gated body in its central position within the casing, said casing, body and vanes being electrically conductive, an active electrode material electrochemically reversible with respect to a selected ion defining the exposed surfaces of the body, the vanes and the interior of the casing, means carried at the ends of the casing for electrically insulated connection to a fluid conduit, and electrically conducting means in electrical contact with the casing for conducting the electric potential from the casing.

2. An electrode construction comprising an open-ended tubular casing, an elongated body centrally disposed in the casing in longitudinal alignment with the casing, a plurality of vanes in longitudinal alignment with the casing connecting the body to the casing and supporting the body in its central position within the casing, said casing, body and vanes being electrically conductive, an active electrode material electrochemically reversible with respect to a selected ion defining the exposed surfaces of the body, the vanes and the interior of the casing, electrically conducting means in electrical contact with the casing for conducting the electric potential from the casing, and means at each end of the casing for electrically insulated connection of the casing in a fluid conduit, said last means comprising a flange at each end of the casing, an electrical insulating gasket against each flange, said flanges and said gaskets having aligned openings, and electrical insulating bushings extending through the aligned openings.

3. An electrode construction as set forth in claim 2 in which the active electrode material defining the exposed surfaces of the body, the vanes and the interior of the casing is metallic silver partially coated with silver chloride.

References Cited in the file of this patent

UNITED STATES PATENTS

| 2,822,324 | Gaylor et al. | Feb. 4, 1958 |
| 2,870,077 | Kushner | Jan. 20, 1959 |

FOREIGN PATENTS

| 123,936 | Great Britain | Mar. 13, 1919 |